(12) United States Patent
Heinke

(10) Patent No.: US 8,136,984 B1
(45) Date of Patent: Mar. 20, 2012

(54) PORTABLE IR THERMOMETER HAVING THERMAL IMAGING CAPABILITY

(75) Inventor: Thomas Heinke, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 348 days.

(21) Appl. No.: 12/411,908

(22) Filed: Apr. 20, 2009

(51) Int. Cl.
*G01J 5/12* (2006.01)
*G01J 5/02* (2006.01)
*G01K 7/02* (2006.01)

(52) U.S. Cl. ..... 374/121; 374/179; 374/170; 250/338.1; 136/200

(58) Field of Classification Search .................. 374/120, 374/121, 137, 179, 208, 124, 129, 1, 170, 374/2, 29, 110–112, 115, 166–167, 4, 5, 374/100, 178; 250/338.1, 339.02, 339.11, 250/338.03, 339.04; 136/200, 225, 213, 136/224
See application file for complete search history.

(56) References Cited

U.S. PATENT DOCUMENTS

| | | | |
|---|---|---|---|
| 4,634,294 A | | 1/1987 | Christol et al. |
| 5,162,658 A | * | 11/1992 | Turner et al. .................. 250/554 |
| 5,288,147 A | * | 2/1994 | Schaefer et al. ................ 374/10 |
| 5,532,484 A | * | 7/1996 | Sweetser et al. .............. 250/332 |
| 5,545,897 A | * | 8/1996 | Jack .......................... 250/339.13 |
| 5,640,015 A | | 6/1997 | Kienitz et al. |
| 5,655,839 A | | 8/1997 | Schmidt et al. |
| 6,034,369 A | * | 3/2000 | Oda ............................ 250/338.1 |
| 6,046,398 A | * | 4/2000 | Foote et al. .................... 136/201 |
| 6,203,194 B1 | * | 3/2001 | Beerwerth et al. ............ 374/133 |
| 6,234,669 B1 | | 5/2001 | Kienitz et al. |
| 6,597,051 B2 | * | 7/2003 | Lubomirsky et al. ......... 257/461 |
| 7,276,697 B2 | * | 10/2007 | Devine ........................ 250/338.1 |
| 7,304,297 B1 | | 12/2007 | King et al. |
| 7,362,224 B2 | * | 4/2008 | Zambon ..................... 340/545.3 |
| 7,369,156 B1 | | 5/2008 | Heinke et al. |
| 7,422,365 B2 | * | 9/2008 | Chamberlain et al. ........ 374/120 |
| 7,591,583 B2 | * | 9/2009 | Foes et al. .......................... 374/5 |
| 7,842,922 B2 | * | 11/2010 | Leneke et al. .............. 250/338.1 |

(Continued)

FOREIGN PATENT DOCUMENTS

JP        62119424 A  *  5/1987

OTHER PUBLICATIONS

Introduction to Thermopile Detectors, Dexter Research Center, Inc., May 17, 2006.

(Continued)

*Primary Examiner* — Gail Verbitsky
(74) *Attorney, Agent, or Firm* — Nelson Mullins Riley & Scarborough LLP

(57) ABSTRACT

A portable noncontact thermometer comprising a housing defining an aperture for ingress of incident thermal energy in a field of view. A graphical display is fixed with respect to the housing. The thermometer further comprises a thermopile array including a plurality of thermopile elements positioned inside the housing so as to be impinged by the incident thermal energy. The thermometer further includes processing circuitry in electrical communication with the thermopile array. The processing circuitry is operative to produce on the graphical display a thermal image of the field of view. The processing circuitry is further operative to determine a temperature of a target location within the field of view based on electrical signals derived from a subset of the thermopile elements. The subset of thermopile elements may be a single thermopile element located approximately at a center of the thermopile array.

27 Claims, 6 Drawing Sheets

U.S. PATENT DOCUMENTS

| | | | | |
|---|---|---|---|---|
| 2002/0191670 | A1* | 12/2002 | Huang et al. | 374/133 |
| 2003/0111605 | A1* | 6/2003 | Sato et al. | 250/338.4 |
| 2003/0222218 | A1* | 12/2003 | Nozu | 250/338.1 |
| 2006/0070650 | A1* | 4/2006 | Fraden | 136/224 |
| 2007/0018105 | A1* | 1/2007 | Grimberg | 250/349 |
| 2007/0187602 | A1* | 8/2007 | Wennmacher et al. | 250/338.1 |
| 2008/0308732 | A1* | 12/2008 | Warnke et al. | 250/330 |

OTHER PUBLICATIONS

Brochure for AXT100 Thermal Imaging Camera, Ann Arbor Sensor Systems, LLC, published Jan. 2006.

Brochure for TPAM 166 L3.9—Array Module, PerkinElmer, published 2004.

* cited by examiner

PORTABLE IR THERMOMETER HAVING THERMAL IMAGING CAPABILITY

BACKGROUND OF THE INVENTION

The present invention relates generally to portable IR thermometers. More particularly, the invention relates to a portable IR thermometer having thermal imaging capability.

Portable infrared (IR) thermometers allow a user to ascertain the temperature of a remote target using a point and click technique. These instruments are commonly utilized for purposes ranging from automotive diagnostics to food safety. Often, these devices will use a single thermopile element at which the thermal energy is focused to ascertain the temperature at the aim point. In order to determine the aim point, the thermometers may be equipped with a laser pointer that emits a laser beam in the forward direction. Various details regarding the construction and operation of noncontact thermometers may be discerned from U.S. Pat. Nos. 4,634,294, 5,640,015 and 6,234,669, each of which is incorporated herein by reference in its entirety for all purposes.

In contrast to a thermometer, thermal imaging cameras are used to create a high quality thermal image of a scene (such as an industrial machine being inspected for predictive maintenance). These cameras typically use a microbolometer array of at least 160×120 pixels to generate the thermal scene. As known in the art, both the microbolometer arrays and the cameras in which they are used are relatively expensive. Therefore, they may be undesirable for many applications in which a more economical noncontact thermometer would be sufficient.

SUMMARY OF THE INVENTION

According to one aspect, the present invention provides a portable noncontact thermometer comprising a housing defining an aperture for ingress of incident thermal energy in a field of view. A graphical display is fixed with respect to the housing. The thermometer further comprises a thermopile array including a plurality of thermopile elements positioned inside the housing so as to be impinged by the incident thermal energy. Various sizes of thermopile arrays may be utilized in accordance with the present invention, including a 4×4 array, a 10×10 array, a 16×16 array or a 32×32 array.

The thermometer further includes processing circuitry in electrical communication with the thermopile array. The processing circuitry is operative to produce on the graphical display a thermal image of the field of view. The processing circuitry is further operative to determine a temperature of a target location within the field of view based on electrical signals derived from a subset of the thermopile elements.

In some exemplary embodiments, the subset of thermopile elements is a single thermopile element located approximately at a center of the thermopile array. The single thermopile element may occupy greater surface area on the array than other thermopile elements. Preferably, the single thermopile element may be directly connected to an amplifier without multiplexing.

Embodiments are contemplated in which the subset of thermopile elements are connected to the processing circuitry without passing through a multiplexer in a common package with the thermopile array. Thermopile elements included in the subset may be connected to a respective amplifier, either inside or outside of the common package. In contrast, thermopile elements other than the subset are preferably connected to the processing circuitry by passing through a multiplexer in the common package.

Preferably, the processing circuitry will be further operative to show the temperature of the target location on the graphical display. For example, the temperature of the target location may be superimposed on the thermal image. In addition, the target location may be indicated by crosshairs superimposed on the thermal image.

In accordance with another aspect, the present invention provides a noncontact thermometer comprising a housing defining an aperture for ingress of incident thermal energy in a field of view. A graphical display is also provided. The thermometer further includes a thermopile detector including a thermopile array having a plurality of thermopile elements arranged in rows and columns. The thermopile detector further has at least one multiplexer in a common package with the array through which a subset of the thermopile elements are connected.

The thermometer further includes processing circuitry in electrical communication with the thermopile detector so as to receive electrical signals from the thermopile elements other than the subset through the at least one multiplexer and from the subset without multiplexing. The processing circuitry is operative to produce on the graphical display a thermal image of the field of view. The processing circuitry is further operative to determine a temperature of a target location within the field of view based on electrical signals from the subset of thermopile elements. For example, the subset of thermopile elements may be a single thermopile element.

Another aspect of the present invention provides a method of detecting temperature of a target location within a field of view. One step of the method involves providing a thermopile array having a plurality of thermopile elements. Electrical signals produced at a subset of the thermopile elements are amplified using a narrower bandwidth amplifier to yield amplified non-multiplexed signals. Electrical signals produced at thermopile elements other than the subset are multiplexed to yield multiplexed signals. The multiplexed signals are amplified using a wider bandwidth amplifier to yield amplified multiplexed signals. The amplified multiplexed signals and the amplified non-multiplexed signals are then processed to produce a thermal image of the field of yield. In addition, the amplified non-multiplexed signals are processed to determine temperature of the target location.

A still further aspect of the present invention provides a thermopile detector configured as a discrete electronic package. The detector comprises a thermopile array having a plurality of thermopile elements. At least one multiplexer is located in the package. A subset of the thermopile elements are connected to respective output terminals of the package without multiplexing. Thermopile elements other than the subset are connected to an output terminal of the package shared with at least one other thermopile element (other than the subset) via a multiplexer.

Additional aspects of the present invention, including various combinations and subcombinations of the disclosed elements, will be apparent from the remainder of the specification.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
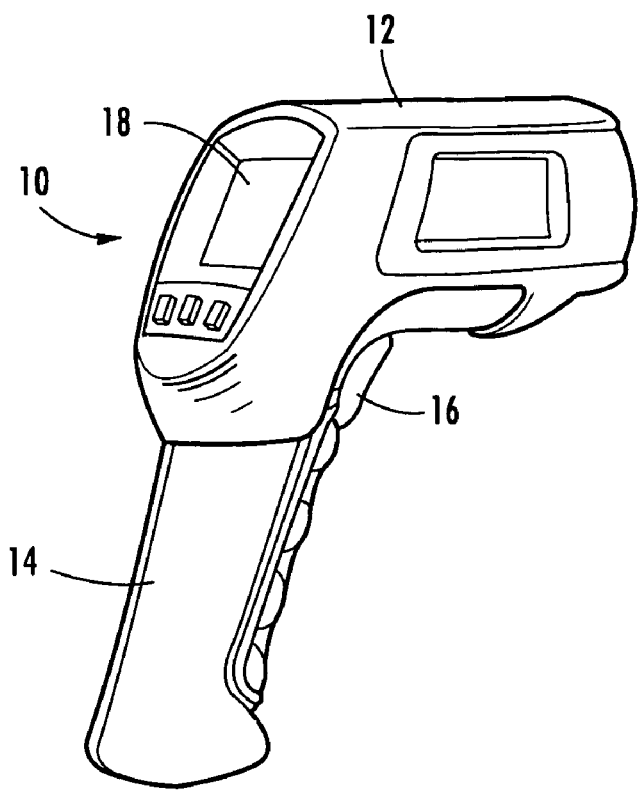
FIG. 1 is a perspective view of a portable IR thermometer constructed in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 2:
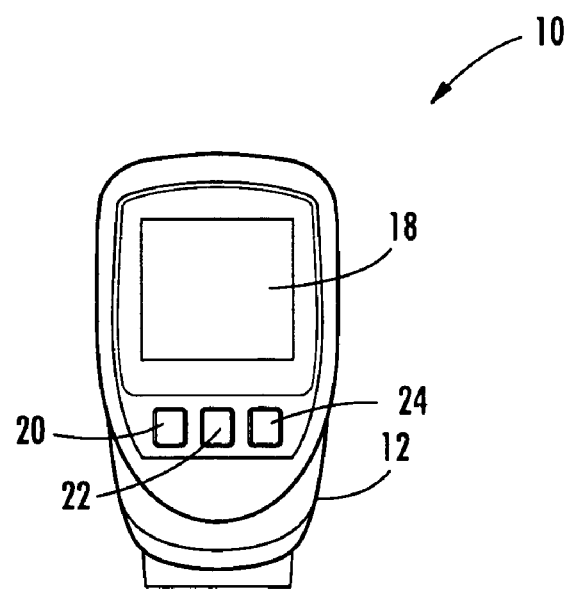
FIG. 2 is a rear view of the thermometer of FIG. 1 showing the display at which thermal images and temperature readings are shown.

FIGS. 1 and 2 illustrate an exemplary hand-held thermometer 10 constructed in accordance with certain principles of the present invention. As will be described more fully below, thermometer 10 includes an internal thermopile detector which collects radiated energy in the instrument's field of view. The energy, typically in the form of infrared (IR) radiation, is isolated and focused on the detector. The thermopile detector includes a thermopile array which functions to produce a thermal image of the scene in the field of view. Even though the resolution of the thermal image may be less than achievable with a more expensive microbolometer camera, it will be adequate for aiming purposes. The energy detected at a subset of the thermopile elements in the array is also used to determine a temperature value of a target location in the scene. Embodiments of the present invention provide accuracy comparable to prior art noncontact thermometers that lack imaging capability.

As shown, thermometer 10 includes a housing 12 in which various internal components (including the thermopile detector) are located. While any suitable material can be utilized, housing 12 is preferably formed of a rigid high impact plastic material. As shown, housing 12 includes a handle 14 on which a trigger 16 is located. Trigger 16 places the thermometer in a "scan" (or active measurement mode). A graphical display 18 is preferably located at the rear of thermometer 10. In this case, a variety of information is shown on display 18, including a reading of the target temperature. Various functions of thermometer 10 are controlled by buttons 20, 22 and 24.

Figure 3:
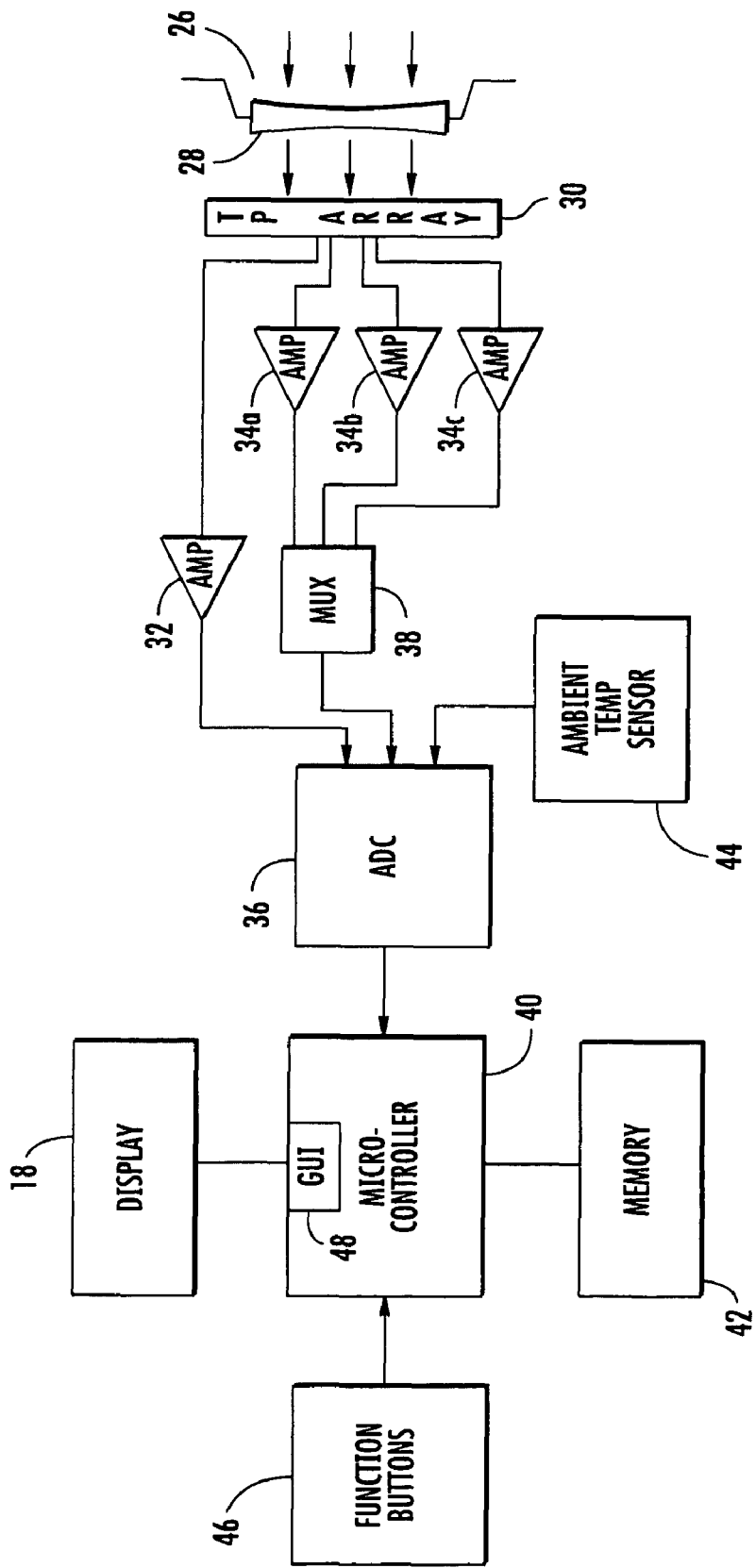
FIG. 3 is a diagrammatic representation showing certain internal components of the thermometer of FIG. 1.

Certain internal components of thermometer 10 will be explained with reference to FIG. 3. Thermal energy from the field of view passes through an aperture 26 defined in housing 12, where it is directed by optics (such as a collimating lens 28) to a thermopile detector 30. Thermopile detector 30 includes a thermopile array having a number of thermopile elements arranged as pixels in rows and columns. Typical array sizes may include 4×4, 10×10, 16×16 or 32×32. A larger array will generally provide a higher resolution thermal image than a smaller array. Additional circuitry may be incorporated into a discrete electronic package along with the thermopile array to yield detector 30.

As shown, the multiple outputs of detector 30 (the number of which will depend on the size of the array) are fed to respective amplifiers 32 and 34a-c. The output of amplifier 32 is then fed to an input of analog-to-digital (A/D) converter 36. The outputs of amplifiers 34a-c are fed to a multiplexer 38, before passing to A/D converter 36.

As will be explained more fully below, amplifier 32 is preferably a narrow bandwidth amplifier having a high signal-to-noise (SN) ratio. In this regard, amplifier 32 preferably receives output from a subset of thermopile elements (typically a single thermopile element) in the array. Amplifiers 34a-c, in contrast, will generally be wider bandwidth amplifiers that each receive signals from multiple thermopile elements that have been multiplexed using multiplexers located on-board thermopile detector 30. For example, each such multiplexer may be in electrical communication with all thermopile elements in a particular row or in a particular column (except for the subset fed through amplifier 32).

The digital signal resulting from A/D converter 36 is then fed to an internal microcontroller 40. Microcontroller 34 utilizes preprogrammed algorithms to convert the digital detector data into thermal image and temperature information. A memory 42 is associated with microcontroller 40 to store temperature information, along with firmware and other information (such as emissivity) utilized during operation. An ambient temperature sensor 44 is provided so that the cold junction (or body) temperature will be known in calculating the target temperature. The ambient temperature sensor can be a separate component or it may be mechanically combined with the thermopile array (but is not a thermopile itself). For example, the ambient temperature sensor can be a thermistor. The function buttons 20, 22 and 24 are collectively indicated at 46.

As shown, graphical display 18 is in electrical communication with microcontroller 40. Preferably, for example, display 18 may be configured as a suitable LCD display capable of showing a thermal image. A color LCD display is especially preferred for this purpose. Some functions of the thermometer may be selected using a graphical user interface (GUI) run on microcontroller 40 (as indicated at 48).

Figure 4:
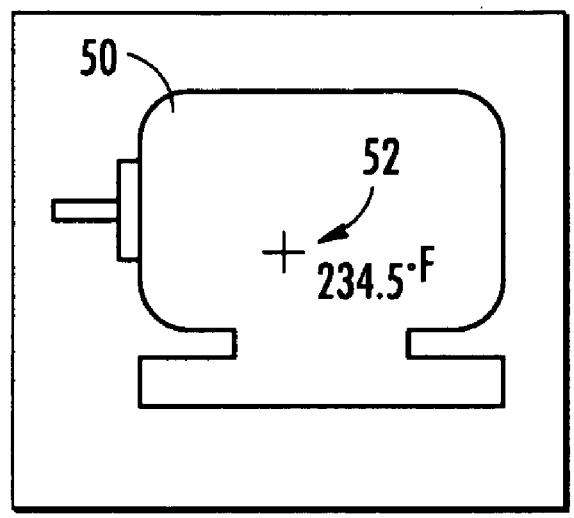
FIGS. 4 and 5 illustrate exemplary displays which may be shown on the display device.
Figure 5:
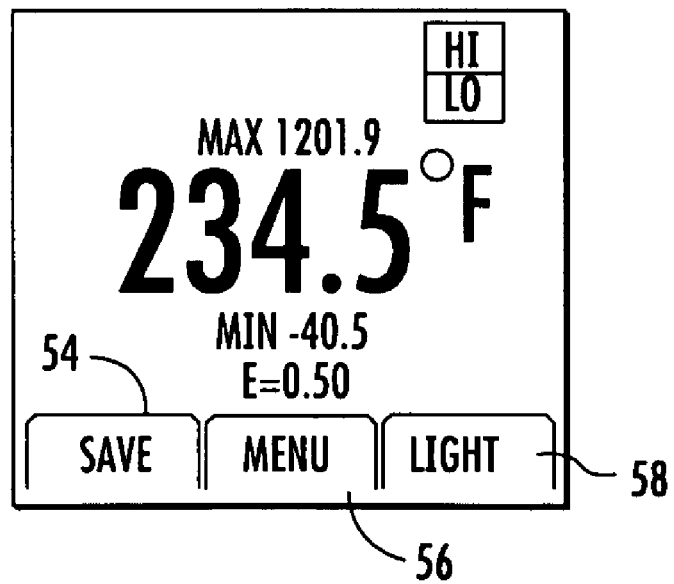

FIGS. 4 and 5 illustrate exemplary screens which may appear on display 18 in accordance with the present invention. Referring first to FIG. 4, a thermal image is shown depicting the scene in the instrument's field of view. In this case, for example, a thermal image of an electric motor 50 being inspected is shown on the display. A "cross hairs" 52 is located in the center of the scene, superimposed on the image. As one skilled in the art will appreciate, the cross hairs represent the aim point at which the thermometer will take a temperature reading. In this case, for example, the display indicates a temperature of 234.5° F. at the intersection of cross hairs 52. Like cross hairs 52, this temperature reading may be superimposed on the thermal image. One skilled in the art will appreciate that the thermal image facilitates aiming of the instrument to ensure that the reading taken is of the correct location.

FIG. 5 illustrates an alternative screen where display of the thermal image has been suspended so that the user can operate the GUI. Three tabs 54, 56 and 58 are located at the bottom of the screen proximate to buttons 20, 22 and 24, respectively. In this case, tab 54 contains the word "Save," tab 56 contains the word "Menu" and tab 58 contains the word "Light." These words indicate the function that may be performed by pressing the corresponding button. These functions may change depending on where a particular screen appears in the GUI menu tree. Thus, there is a direct association between each button and the on-screen information located above it.

Various icons may also be displayed on the screen. In this case, for example, the measured temperature (e.g., 234.5° F.) is preferably shown in large font in the center of the screen. The current emissivity, in this case 0.50, may also be displayed on the screen. In this example, the screen shows that both high and low alarms have been set. Specifically, thermometer 10 may be equipped with an audible indicator, such as a buzzer, that is activated when either a high or low condition is encountered. In other words, if the temperature either exceeds the high alarm level or drops below the low alarm level, a conspicuous indicator may be provided. The words "Hi" or "Lo" on the screen may blink to inform the user of the relevant alarm condition.

Figure 6:
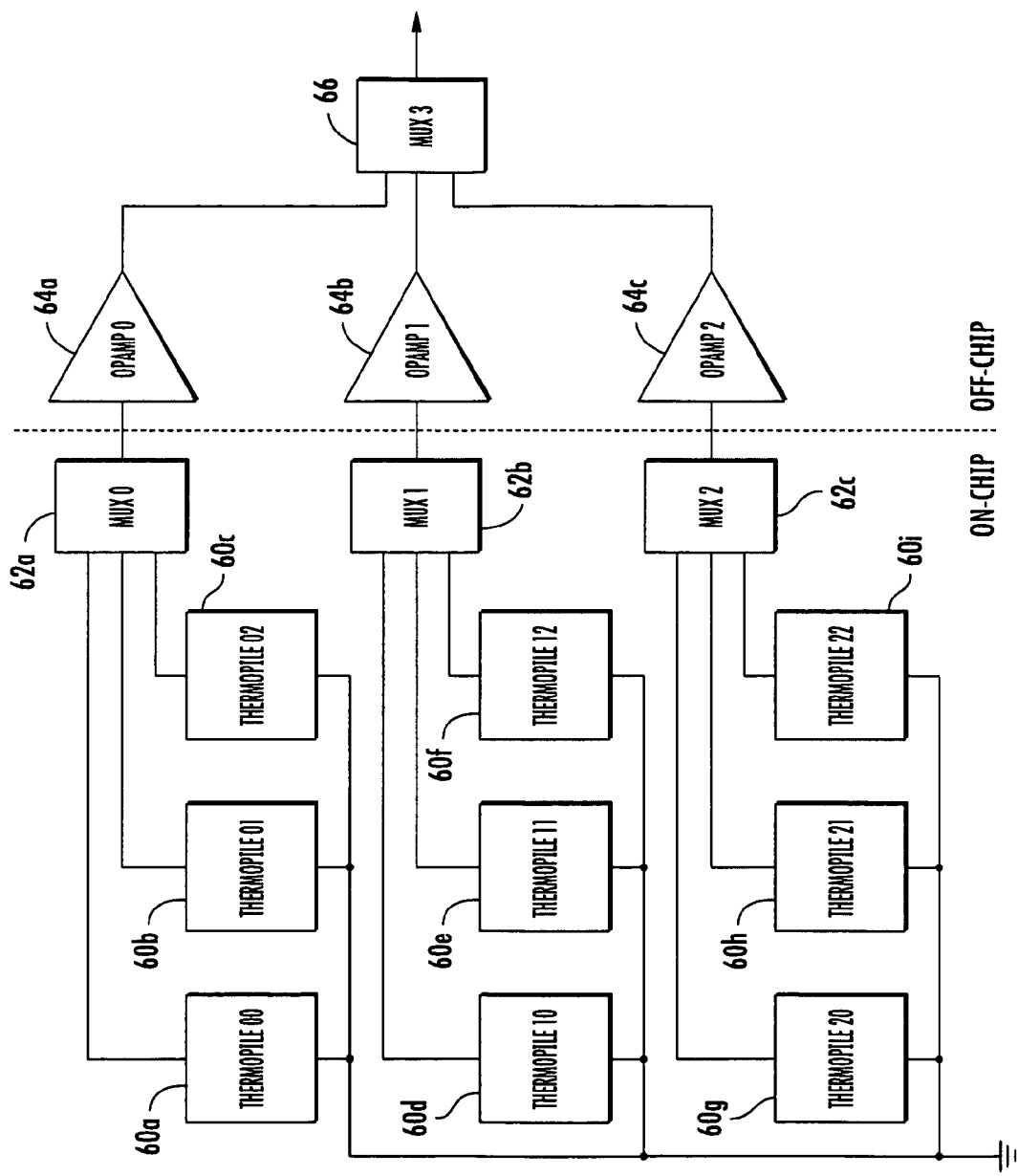
FIG. 6 is a diagrammatic representation of a thermopile array in which all of the thermopiles feed signal information to multiplexers.

FIG. 6 illustrates a technique for producing a thermal image using a thermopile array that would generally be unsuitable for accurate spot temperature detection. In this example, a 3×3 thermopile array has a total of nine thermopile elements 60a-i arranged in three rows and three columns. Each row of thermopile elements feeds to a respective multiplexer 62a-c located in the same discrete electronic package with the thermopile array. The output of each multiplexer forms a respective pin of the electronic package for connection to external components. Thus, as shown, each of multiplexers 62a-c is connected to the input of a respective off-chip amplifier 64a-c. The amplifier outputs are then multiplexed at 66 before being digitized for image processing.

Because amplifiers 64a-c receive a multiplexed output, they need to have a much higher bandwidth than an amplifier for a single thermopile element of the same data rate. The higher bandwidth would typically result in a much worse SN ratio than a narrower bandwidth amplifier for a single thermopile element. While the performance of a multiplexed pixel might be acceptable if only imaging is desired, it will degrade accuracy of a calculation of temperature at that pixel. Because single spot noncontact thermometers generally require high accuracy, the performance of a multiplexed pixel will typically be unacceptable for this purpose.

Figure 7:
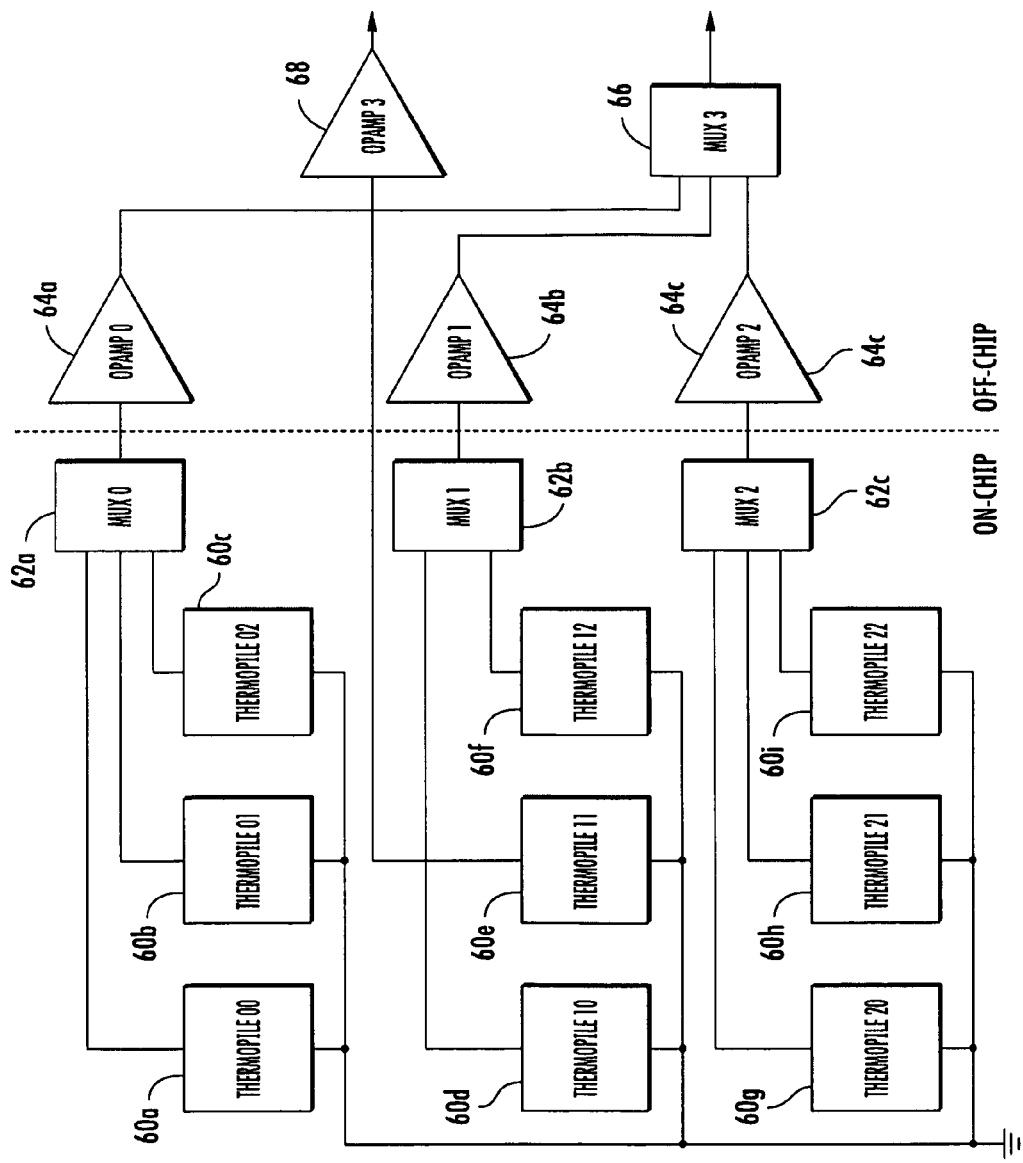
FIG. 7 is a diagrammatic representation of a thermopile array similar to FIG. 6 but with one of the thermopiles bypassing the multiplexers.

Thus, referring to FIG. 7, embodiments of the present invention "isolate" one thermopile element and have an individual amplifier for such pixel with a lower, optimized bandwidth. Thus, the arrangement of FIG. 6 is modified such that thermopile element 60e (also referred to as thermopile 11) is connected directly to an amplifier 68 rather than to multiplexer 62b (the output of which is connected to amplifier 64b). The outputs of both multiplexer 66 and amplifier 68 are used in producing the thermal image, but the output of amplifier 68 will have better a SN ratio. This, in turn, yields greater accuracy in the spot temperature calculation. Amplifier 68 may be incorporated into the electronic package of the thermopile detector or it may implemented off-chip as a separate component (as shown).

Figure 8:
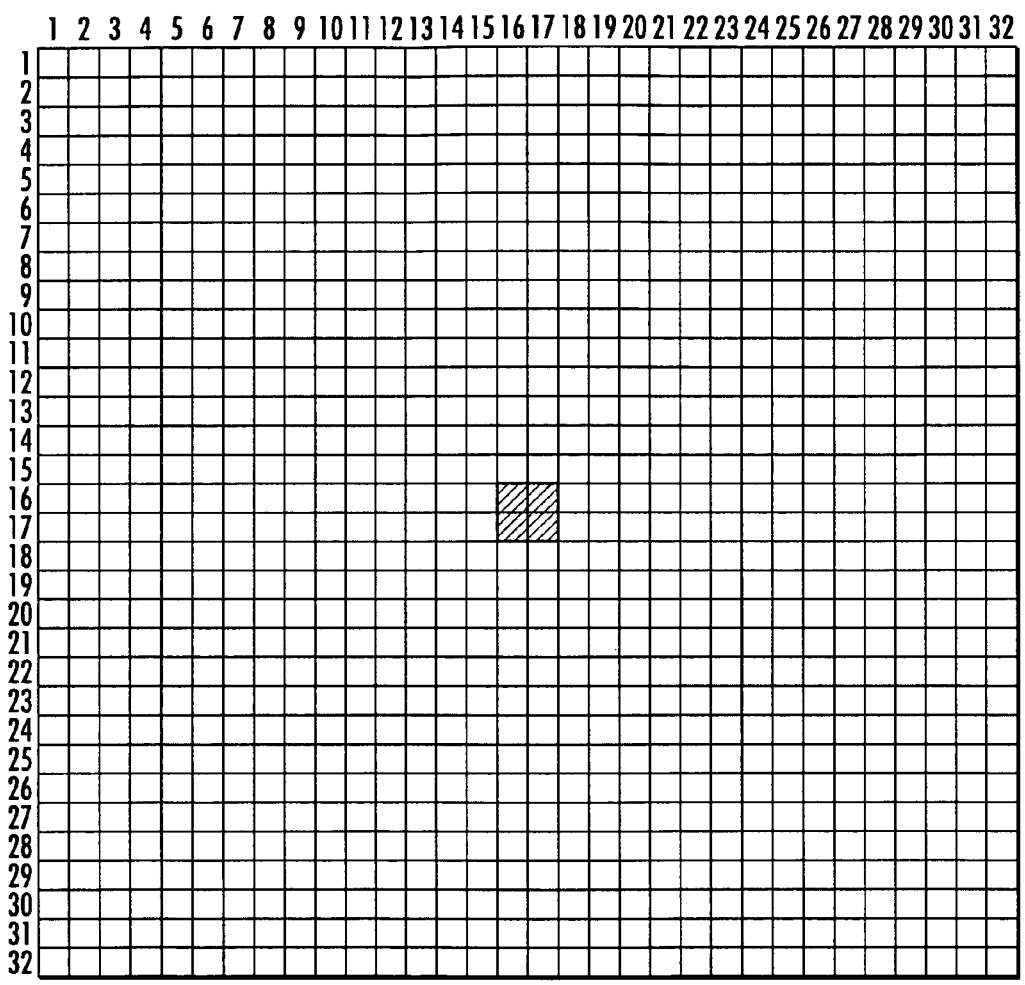
FIG. 8 is a diagrammatic representation of a 32×32 thermopile array with a larger center pixel being utilized for temperature measurement.

While FIGS. 6 and 7 illustrate a 3×3 thermopile array for purposes of discussion, the principles of the present invention are generally more beneficial on a larger array. For example, FIG. 8 shows a thermopile array having thirty-two rows and thirty-two columns (32×32). While the spot temperature can be taken at a single thermopile element having the same physical size as the others, this embodiment uses a larger center pixel for this purpose. As can be seen, the center pixel in this example occupies the "real estate" of 2×2 regular thermopiles. Such an embodiment is believed to enhance SN ratio.

Alternatively, the array may be configured so that the spot temperature is determined from the output of multiple thermopiles. For example, multiple thermopiles in the center (e.g. 2×2), each having the same size as all other thermopiles on the array, may be connected together to provide a single output. In this regard, the multiple thermopiles may be wired in series to provide a higher output signal. Such wiring can be done on the array so that the series of those center thermopiles has only a single output to an amplifier, or it can be done outside (in which case each of those pixels would need outputs available outside of the array to allow for wiring together). This embodiment might be advantageous if a thermopile technology is optimized for a certain pixel size, so that a larger center pixel would cause problems and a lower yield in the manufacturing process.

While the spot measurement pixels will typically be in the center of the array, they need not be located in the center depending on the exigencies of a particular application.

It can thus be seen that the present invention provides a portable IR thermometer with accurate location temperature measurement and thermal imaging. While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. A portable noncontact thermometer comprising:
  a housing defining an aperture for ingress of incident thermal energy in a field of view;
  a graphical display fixed with respect to said housing;
  a thermopile array including a plurality of thermopile elements, said thermopile array being positioned inside said housing so as to be impinged by said incident thermal energy;
  processing circuitry in electrical communication with said thermopile array, said processing circuitry being operative to produce on said graphical display a thermal image of said field of view;
  said processing circuitry being further operative to determine a temperature of a target location within said field of view based on electrical signals derived from a subset of said thermopile elements; and
  wherein said subset of said thermopile elements are connected to said processing circuitry without passing through a multiplexer in a common package with said thermopile array whereas outputs of said thermopile elements which are not among said subset of thermopile elements are multiplexed before amplification.

2. A portable noncontact thermometer as set forth in claim 1, wherein said subset of said thermopile elements is a single thermopile element.

3. A portable noncontact thermometer as set forth in claim 2, wherein said single thermopile element is located approximately at a center of said thermopile array.

4. A portable noncontact thermometer comprising:
  a housing defining an aperture for ingress of incident thermal energy in a field of view;
  a graphical display fixed with respect to said housing;
  a thermopile array including a plurality of thermopile elements, said thermopile array being positioned inside said housing so as to be impinged by said incident thermal energy;

processing circuitry in electrical communication with said thermopile array, said processing circuitry being operative to produce on said graphical display a thermal image of said field of view;

said processing circuitry being further operative to determine a temperature of a target location within said field of view based on electrical signals derived from a subset of said thermopile elements; and wherein said subset of said thermopile elements is a single thermopile element that is located approximately at a center of said thermopile array and occupies greater surface area on said array than other of said thermopile elements.

5. A portable noncontact thermometer as set forth in claim 3, wherein said single thermopile element is directly connected to an amplifier without multiplexing.

6. A portable noncontact thermometer as set forth in claim 1, wherein said thermopile elements other than said subset are connected to said processing circuitry by passing through a multiplexer in said common package.

7. A portable noncontact thermometer as set forth in claim 1, wherein said thermopile elements within said subset are each connected to a respective amplifier.

8. A portable noncontact thermometer as set forth in claim 1, wherein said thermopile array is a 4×4 array.

9. A portable noncontact thermometer as set forth in claim 1, wherein said thermopile array is a 10×10 array.

10. A portable noncontact thermometer as set forth in claim 1, wherein said thermopile array is a 16×16 array.

11. A portable noncontact thermometer as set forth in claim 1, wherein said thermopile array is a 32×32 array.

12. A portable noncontact thermometer as set forth in claim 1, wherein said processing circuitry is further operative to show said temperature of said target location on said graphical display.

13. A portable noncontact thermometer as set forth in claim 12, wherein said temperature of said target location is superimposed on said thermal image.

14. A portable noncontact thermometer as set forth in claim 1, wherein said target location is indicated by crosshairs superimposed on said thermal image.

15. A noncontact thermometer comprising:
   a housing defining an aperture for ingress of incident thermal energy in a field of view;
   a graphical display;
   a thermopile detector including a thermopile array having a plurality of thermopile elements arranged in rows and columns;
   said thermopile detector further having at least one multiplexer in a common package with said array through which a subset of said thermopile elements are connected;
   processing circuitry in electrical communication with said thermopile detector so as to receive electrical signals from said thermopile elements other than said subset through said at least one multiplexer and from said subset without multiplexing;
   said processing circuitry being operative to produce on said graphical display a thermal image of said field of view; and
   said processing circuitry being further operative to determine a temperature of a target location within said field of view based on electrical signals from said subset of said thermopile elements.

16. A noncontact thermometer as set forth in claim 15, wherein said subset of said thermopile elements is a single thermopile element.

17. A noncontact thermometer as set forth in claim 16, wherein said single thermopile element is located approximately at a center of said thermopile array.

18. A noncontact thermometer as set forth in claim 17, wherein said single thermopile element occupies greater surface area on said array than other of said thermopile elements.

19. A noncontact thermometer as set forth in claim 15, wherein said subset of said thermopile elements are each connected to a respective amplifier.

20. A noncontact thermometer as set forth in claim 15, wherein said temperature of said target location is superimposed on said thermal image.

21. A noncontact thermometer as set forth in claim 15, wherein said target location is indicated by crosshairs superimposed on said thermal image.

22. A method of detecting temperature of a target location within a field of view, said method comprising steps of:
   (a) providing a thermopile array having a plurality of thermopile elements;
   (b) amplifying electrical signals produced at a subset of said thermopile elements using a narrower bandwidth amplifier to yield amplified non-multiplexed signals;
   (c) multiplexing electrical signals produced at said thermopile elements other than said subset to yield multiplexed signals;
   (d) amplifying said multiplexed signals using a wider bandwidth amplifier to yield amplified multiplexed signals;
   (e) processing said amplified multiplexed signals and said amplified non-multiplexed signals to produce a thermal image of said field of yield; and
   (f) processing said amplified non-multiplexed signals to determine temperature of said target location.

23. A method as set forth in claim 22, wherein said subset of said thermopile elements is a single thermopile element.

24. A method as set forth in claim 23, wherein said single thermopile element is located approximately at a center of said thermopile array.

25. A method as set forth in claim 22, wherein said electrical signals are multiplexed in step (c) using at least one multiplexer located in a common package with said thermopile array.

26. A method as set forth in claim 22, wherein said temperature of said target location is superimposed on said thermal image.

27. A thermopile detector configured as a discrete electronic package, said detector comprising:
   a thermopile array having a plurality of thermopile elements;
   at least one multiplexer located in said package;
   a subset of said thermopile elements being connected to respective output terminals of said package without multiplexing; and
   said thermopile elements other than said subset being connected to an output terminal of said package shared with at least one other of said thermopile elements other than said subset via one of said at least one multiplexer.

* * * * *